United States Patent [19]
Carlton

[11] 3,938,719
[45] Feb. 17, 1976

[54] STORAGE MEANS FOR MOTORCYCLES AND LIKE VEHICLES

[76] Inventor: Ronald C. Carlton, 1002 Welch Blvd., Flint, Mich. 48504

[22] Filed: Aug. 24, 1973

[21] Appl. No.: 391,457

[52] U.S. Cl............... 224/36; 224/32 R; 150/1.5 B; 248/96
[51] Int. Cl.²........................................... B62J 7/02
[58] Field of Search.......... 224/2 A, 1 R, 1 A, 29 B, 224/29 R, 30 R, 30 A, 32 R, 36; 150/1.5 B; 248/96, 311

[56] References Cited
UNITED STATES PATENTS

| | | | |
|---|---|---|---|
| 1,628,771 | 5/1927 | Frisk | 150/1.5 B |
| 1,683,169 | 9/1928 | De Noya | 248/96 UX |
| 1,739,702 | 12/1929 | Wing | 248/96 |
| 2,570,504 | 10/1951 | Van House | 224/29 B |
| 2,613,952 | 10/1952 | Lannon | 150/1.5 B X |
| 3,142,424 | 7/1964 | Reed | 224/2 A X |
| 3,301,448 | 1/1967 | Inque | 224/32 R |

FOREIGN PATENTS OR APPLICATIONS

| | | | |
|---|---|---|---|
| 12,394 | 5/1910 | United Kingdom | 224/30 A |
| 638,983 | 6/1928 | France | 248/311 |

*Primary Examiner*—Robert J. Spar
*Assistant Examiner*—Jerold M. Forsberg
*Attorney, Agent, or Firm*—Basile and Weintraub

[57] ABSTRACT

Storage apparatus for transporting goods, such as, sporting equipment, grocery parcels and the like includes a container for the goods and attachment means for detachably securing the container to a motorcycle or like vehicle.

8 Claims, 4 Drawing Figures

U.S. Patent  Feb. 17, 1976  3,938,719
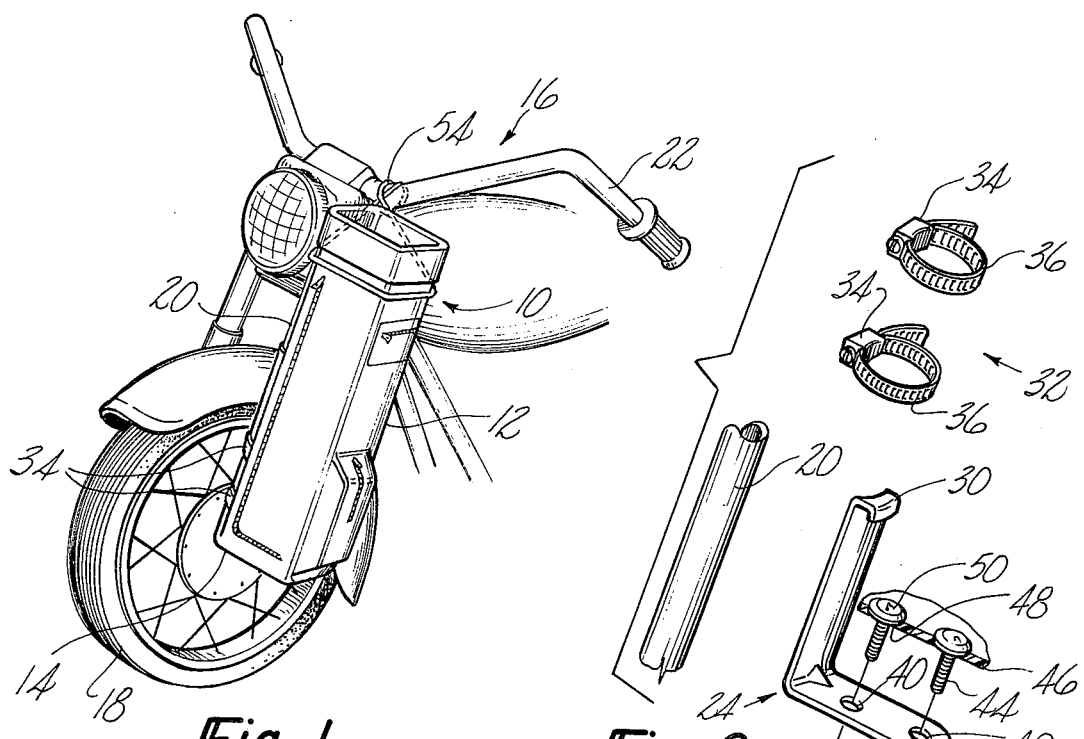
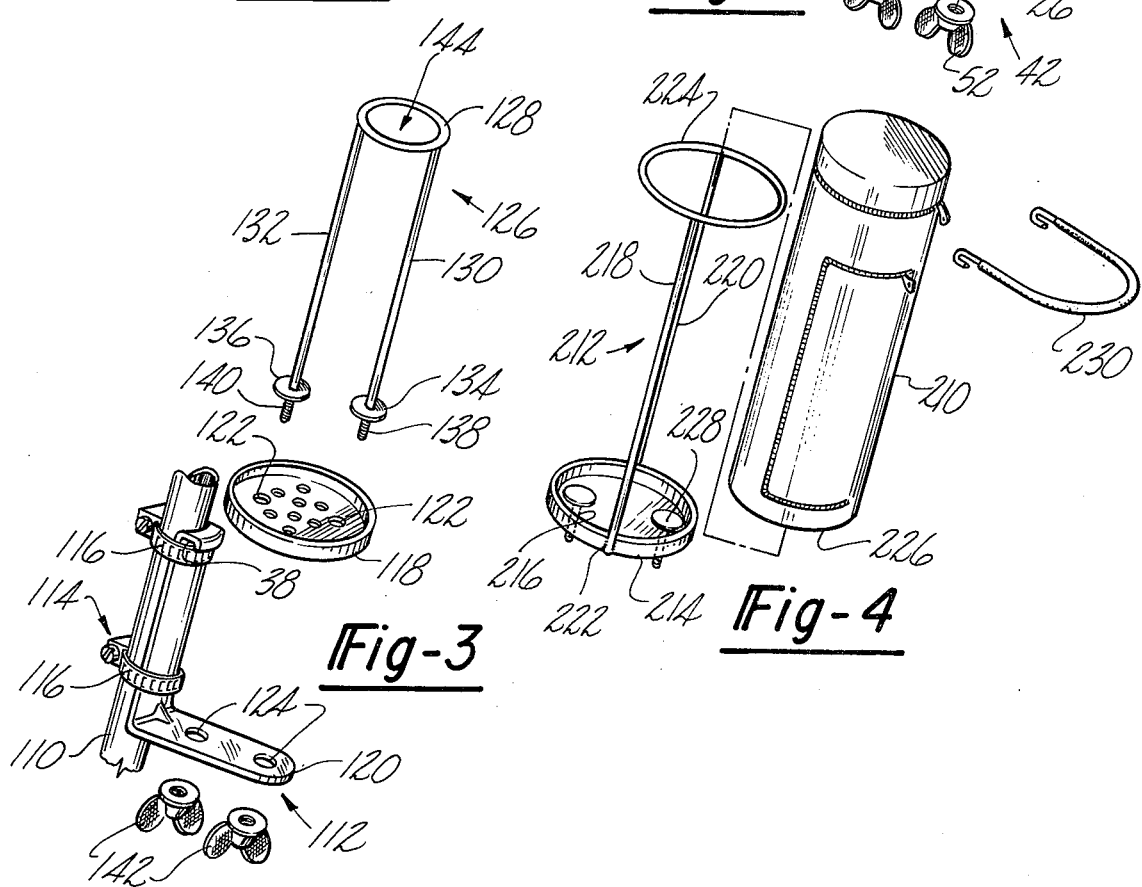

STORAGE MEANS FOR MOTORCYCLES AND LIKE VEHICLES

BACKGROUND OF THE INVENTION

1. Field of the Invention

The present invention pertains to storage apparatus. More particularly, the present invention pertains to vehicle associated storage apparatus. Even more particularly, the present invention pertains to apparatus for storing and transporting goods, the apparatus being associated with a motorcycle or like vehicle.

2. Prior Art

A plurality of devices have been devised or facilitating the storage and transportation of goods for a rider of motorcycles, bicycles and like vehicles.

For example, U.S. Pat. No. 3,286,891 teaches a golf club carrier attached to the rear wheel fender and luggage carrier. Such a device requires the presence of a luggage carrier on the vehicle in order to achieve attachment. Moreover, usage of such a device requires displacement and relocation of safety devices, such as, tail lights, license plates and the like.

A similar type of carrier is disclosed in U.S. Pat. No. 2,919,758. However, such a carrier is specifically adapted for use with a powered golf cart. The carrier of this reference is not useful on an open road, or the like, because of vision obstructions associated therewith.

U.S. Pat. No. 3,659,761 teaches a rack exclusively adapted for transporting a surfboard by a bicycle rider. Such a device does not impart sufficient aerodynamic stability for traveling at the speeds associated with a motorcycle. Moreover, the carrier creates interference with regard to steering the vehicle, pedalling the vehicle and other motive operations.

U.S. Pat. No. 2,771,305 teaches a motorcycle saddle bag mounting which attaches to the fender of the rear wheel of the vehicle. Inherent with saddle bags is their inability to transport and store large articles, thus, negating their utility.

Other storage and transport paraphenalia taught by the prior art is evidenced by U.S. Pat. Nos. 1,044,867 and 3,623,747. Such prior art encounters and exhibits the same deficiencies as outlined hereinabove.

The present invention overcomes the problems encountered in the prior art while providing major improvements thereover.

SUMMARY OF THE INVENTION

In accordance with the present invention there is provided a vehicle-associated storage apparatus for transporting goods, and in particular a storage apparatus for use with two-wheeled vehicles, such as, motorcycles, bicycles, and the like.

The apparatus hereof includes a container or storage means and means for attaching the container to a frame structure of the vehicle.

The means for attaching includes a support structure for supporting the container thereon.

The means for attaching, also, includes means for rapidly detaching the container from the support structure.

The present invention, also, contemplates the use of reinforcing structure to impart rigidity to the container. Further, the present invention contemplates framing structure adapted to provide interchangeability of containers.

The present invention does not interfere with visual observations by the vehicle rider. Moreover, the present invention does not interfere with the aerodynamic stability of the vehicle.

For a more complete understanding of the present invention reference is made to the following detailed description and accompanying drawing. In the drawing like reference characters refer to like parts throughout the several views, in which:

BRIEF DESCRIPTION OF THE DRAWING

FIG. 1 is a perspective view of the vehicle associated storage means of the present invention;

FIG. 2 is an exploded, partially broken, partly in section, perspective view of the attachment means of the present invention;

FIG. 3 is an exploded, perspective view of a framing structure for use with the storage apparatus of the present invention; and FIG. 4 is an exploded, perspective view of the storage means hereof having reinforcement means associated therewith.

DESCRIPTION OF THE PREFERRED EMBODIMENTS

In accordance with the present invention and with reference to the drawing, and in particular, FIG. 1, there is depicted a storage apparatus, generally indicated at 10.

The apparatus 10, generally, includes a container or storage means 12 and attachment means 14 for securing the container 12 to a vehicle, generally indicated at 16.

The vehicle for which the present invention is adapted can comprise any two-wheeled vehicle having a front wheel 18 and a rear wheel (not shown). Thus, the present invention can be deployed in conjunction with a motorcycle, motorbike, bicycle, or the like.

The only criterion associated with the vehicle 16 is that it have a suitable frame structure 20, extending upwardly from the axle of the wheel 18 (not shown) such as, to the handlebars 22. The presence of the frame structure 20 enables attaching of the attachment means 14 to the vehicle 16.

It is to be further understood that although only one storage apparatus is illustrated herein, a plurality of same can be utilized herein, by attachment to both sides of the wheel, either front or rear, or both.

It should be further noted with regard hereto, that the term "frame structure" refers to any part of the vehicle extending as hereinbefore described and may include a shock absorber or the like.

Referring now to FIG. 2, there is depicted therein the assembly of the attachment means 14 hereof. The support structure 24 has a first leg 26 extending parallel to the axle of the wheel 18 which seatingly retains the container 12 thereon, in a manner described subsequently. The support structure 24, also, includes second leg integrally formed with the first leg 26 and generally perpendicular thereto. The second leg is adapted to abut the frame structure 20.

A securing lip 30 is integrally formed with the second leg, at its free end. The securing lip 30 obviates any possibility of detachment of clamping means used herein.

The attachment means 14 further includes clamping means 32, such as, at least one screw clamp 34. The screw clamp 34, as is known to those skilled in the art constricts or expands upon rotation of the screw associated therewith.

The clamping means 32 interconnects the support structure 24 to the frame structure 20. This is achieved by mounting the ring portion 36 about the leg of the support structure 24 and the frame structure 20 as shown in FIG. 3. Rotation of the screw then fixedly secures the leg to the frame structure 20. The lip 30, as shown in FIG. 3, prevents undue slippage of the support structure in relation to the clamping means 32 by providing an engagement undersurface 38. It is to be understood that although the present clamping means has been described with reference to a screw clamp, other clamping means for fixedly securing the support structure to the frame structure can be used with equal efficacy herein.

Referring again to FIG. 2, the leg 26 of the support structure 24, also, includes at least one aperture 40 provided therethrough, two such apertures being shown. The aperture cooperates with quick detachment means or assembly 42 to detachably mount the container 12 onto the support structure 24.

The quick detachment means includes at least one fastener 44, such as a threaded bolt or the like which is adapted to be insertable through the aperture 40.

The fastener 44 is disposed within the interior of the container 12 and extends therefrom through the base 46 of the container via an aperture 48 provided therethrough. The aperture 48 registers with aperture 40 when actuating or connecting together the quick detachment assembly.

The head 50 of the fastener 40 seats over the aperture 48 and prevents the fastener from passing therethrough.

Locking means, such as a connector or nut 52 or the like, is disposed beneath the leg 26 of the support structure 24. The locking means is threadably connected to the fastener. By connecting the nut 52 to the bolt 44, the carrier 12 is securely supported on the support structure 24. Moreover, by using an assembly of the type herein described quick detachment of the carrier is achieved by unscrewing the nut from the bolt, without interfering with the attachment of the support structure to the frame structure.

Referring again to FIG. 1, a flex cable 54 can be used to secure the top portion of the carrier to the handlebars, as shown.

Referring now to FIG. 3, there is depicted therein an alternate embodiment of the present invention. As in the previous embodiment, a vehicle frame structure 110 has a support structure 112 secured thereto through suitable clamping means 114, such as, screw clamps 116.

In accordance with this embodiment, a plate member 118 is adapted to seat atop the first leg 120 of the support structure 112. The plate member 118 is provided with a plurality of apertures 122 therethrough. The apertures 122 are adapted to be in registry with apertures 124 provided in the first leg 122 of the support structure 112.

A framing structure 126 mounts atop the plate member 118, substantially perpendicular thereto. The framing structure 126 includes a ring-like member 128 and a pair of downwardly depending legs 130, 132. The legs 130, 132 are substantially diametrically spaced apart from each other and are integrally formed with the ring-like member 128.

The legs 130, 132 are each provided with an annular shoulder or flange 134, 136, respectively, proximate their respective free ends. The flanges define an abutment or stop between the plate member 118 and the framing structure 126.

The lower portion of the legs 130, 132 is threaded, as at 138, 140 between the flanges and the free ends thereof. Thus, the legs 130, 132 are rendered threadly connectable to connectors, such as, wing nuts 142. The framing structure 126 is deployed by inserting the legs 130, 132 through the registering apertures 122, 122 and connecting the wing-nuts 142 to the threaded portions 138, 140 of the legs at the under surface of the first leg 120 of the support structure 112.

Any suitable container (not shown) can then be inserted into the space defined between the legs 130, 132 and the plate member 118, as indicated by the arrow 144. In this embodiment, there is no need to directly attach the container to the attachment means.

Referring now to FIG. 4 there is depicted therein still a further embodiment of the present invention. In this embodiment, and for purposes of clarity, the attachment means have been omitted from illustration. In this embodiment a carrier 210 is fitted with a reinforcing structure 212 the reinforcing structure interconnecting the carrier 210 to the attachment means.

The reinforcing structure 212, which is disposed in the carrier 210, includes a base 214 which engages the bottom of the carrier and having at least one aperture 216 formed therethrough. The structure 212 further includes a pair of spaced apart, substantially diametrically opposed legs 218, 220. The legs, each, at one end thereof, are fixedly secured to the base 214, such as by welding or the like, as at 22.

The legs 218, 220 extend upwardly substantially perpendicular to the base 214.

A ring member 224 is disposed substantially parallel to the base 214 and is fixedly secured to the legs 218, 220 at the other ends thereof.

The legs 218, 220 are dimensioned such that when the base 214 abuts the bottom 226 of the carrier, in a manner hereinafter described, the ring member 224 is disposed proximate the top of the container 210.

The bottom 226 of the carrier 210 is provided with at least one aperture (not shown) adapted to be in registry with the aperture 216 provided in the base 214.

In deploying the reinforcing structure 212, it is inserted into the interior of the carrier.

A fastener, such as a threaded bolt 228, is insertable through the apertures provided in the base 214, the bottom 226 of the carrier 210, as well as in the support structure, and is connectable to any suitable connector, such as hereinbefore described, to achieve interconnection between the carrier and the support structure.

A flex cable 230 can be used to interconnect or attach the top of the carrier to the handlebars of the vehicle (See FIG. 1).

It should be noted herein that the attachment means, as well as the framing structure and reinforcing structure can be formed from any suitable material, such as, steel, iron and the like.

It should further be noted that the present invention does not in any manner interfere with or alter the handling and manuvering profile of the vehicle associated therewith.

Having thus described my invention, what is claimed is:

1. In combination with a two-wheeled vehicle having a frame structure extending from a wheel axle, a storage means comprising:
   a. a support structure comprising a first leg extending parallel to and co-axial with the axle of a wheel and having a lip formed at its upper end, and a second leg substantially perpendicular to the first leg and formed at the lower end of the first leg and having an aperture formed therethrough, the first leg abutting the frame substantially along the extent of the first leg,
   b. means for attaching the first leg to the frame structure, the lip preventing the slippage of the leg past the means for attaching,
   c. a carrier for storing and transporting goods therein, the carrier having an aperture formed in the bottom thereof, the bottom seating on the second leg and the aperture being in registry with the aperture formed in the second leg, and
   d. quick detachment means extending through the registering apertures for detachably supporting the carrier on the second leg of the support structure.

2. The storage means of claim 1 wherein the means for attaching comprises clamping means which fixedly secures the first leg of the support structure to the frame structure.

3. The storage means of claim 1 wherein the quick detachment means includes a fastener extending through the apertures and a connector detachably connectable to the fastener.

4. The storage means of claim 1 which further comprises:
   a plate member which seats on the support structure, and having at least one aperture formed therethrough,
   the support structure having at least one aperture formed therethrough and adapted to be in registry with the aperture in the plate member,
   a framing structure mountable atop the plate member,
   the framing structure including at least one leg insertable through the registering apertures, and wherein
   the quick disconnect means includes a threaded portion of the leg and a connector threadably connectable thereto to interconnect the framing structure and plate member to the support structure,
   the carrier being disposed within the framing structure and seating atop the plate member.

5. The storage means of claim 1 which further comprises:
   a reinforcing structure disposed within the carrier, the reinforcing structure including a base having at least one aperture formed therethrough, the base engaging the bottom of the carrier,
   the carrier having at least one aperture formed in the bottom thereof and adapted to be in registry with the base aperture,
   the support structure having at least one aperture formed therein and adapted to be in registry with the other apertures, and wherein
   the quick detachment means comprises a fastener insertable through the apertures and a connector connectable to the fastener for interconnecting the base, and the carrier to the support structure.

6. The storge means of claim 5 wherein the connector is threadably connectable to the fastener.

7. The storage means of claim 1 wherein the vehicle is a motorized vehicle.

8. The storage means of claim 1 wherein the vehicle is a motorized vehicle, the frame structure extends from the front wheel axle to the handlebars of the vehicle, and which further includes a flex cable which connects the top of the carrier to the handlebars.

* * * * *